United States Patent [19]
Seto

[11] Patent Number: 4,769,595
[45] Date of Patent: Sep. 6, 1988

[54] PULSE LENGTH INDICATOR

[75] Inventor: Kan-Chiu Seto, San Jose, Calif.

[73] Assignee: Tandem Computers, Inc., Cupertino, Calif.

[21] Appl. No.: 912,490

[22] Filed: Sep. 26, 1986

Related U.S. Application Data

[63] Continuation-in-part of Ser. No. 880,390, Jun. 30, 1986, abandoned.

[51] Int. Cl.$^4$ .............................................. G01P 3/48
[52] U.S. Cl. ................................... 324/168; 340/659; 340/662
[58] Field of Search ................ 324/168, 160; 340/659, 340/662

[56] References Cited

U.S. PATENT DOCUMENTS

| | | | |
|---|---|---|---|
| 3,585,477 | 6/1971 | Shacknow | 340/659 |
| 3,781,677 | 12/1973 | Hagen | 324/168 |
| 4,100,459 | 7/1978 | Nakamura et al. | 340/659 |
| 4,543,566 | 9/1985 | Buck et al. | 340/659 |

Primary Examiner—M. H. Paschall
Assistant Examiner—Jeffrey A. Gaffin
Attorney, Agent, or Firm—Townsend and Townsend

[57] ABSTRACT

A pulse length indicator, for signaling when the length of a pulse from a cyclic signal source has exceeded a chosen duration, has a ramp signal generator, coupled to the cyclic signal source, which produces a ramp signal. The level of the ramp signal is dependent upon the duration of either of the high and low levels of the cyclic signal. The ramp signal is fed to a level sensitive switch which couples an indicator, typically an LED, to a power source. When the level of the ramp signal is sufficiently long or short, the switch closes to actuate the indicator. The ramp signal generator can be a simple R-C circuit with the signal source being AC or DC coupled to the switch.

9 Claims, 2 Drawing Sheets

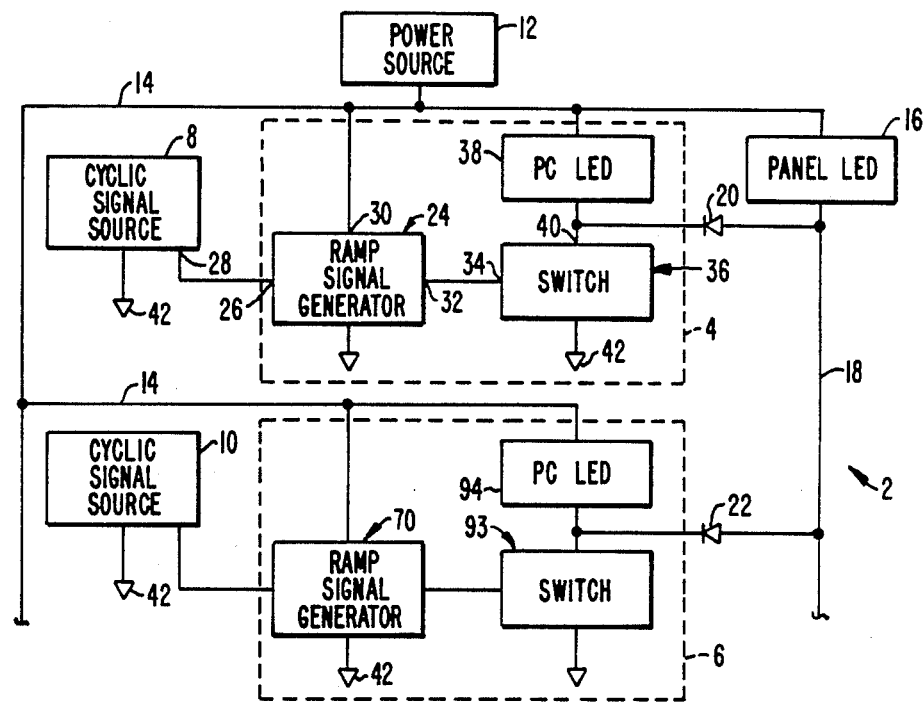
FIG._1.
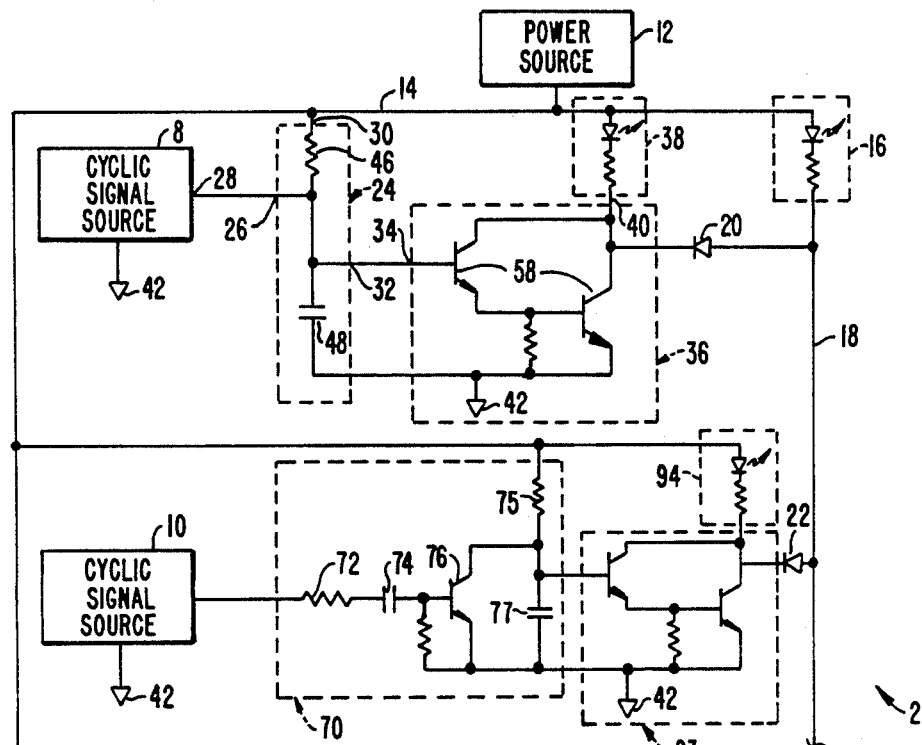
FIG._2.

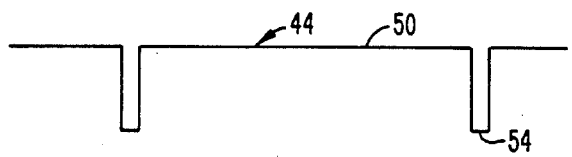
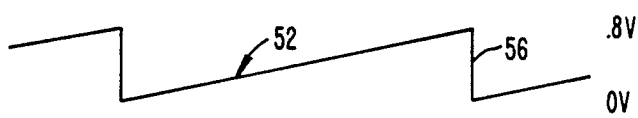
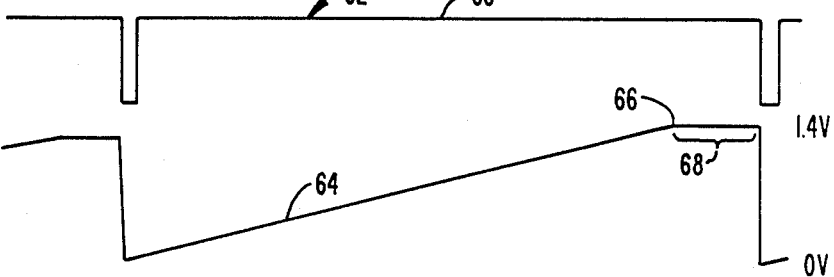
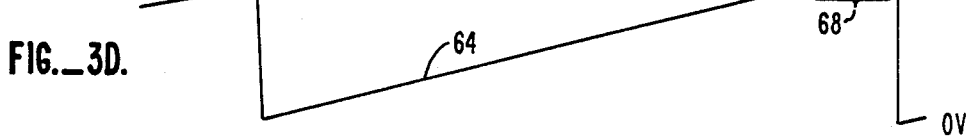
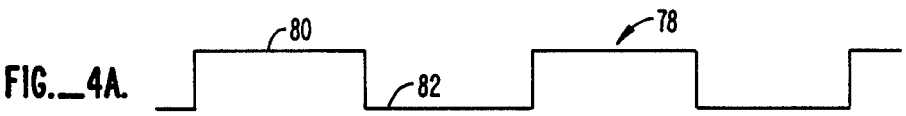
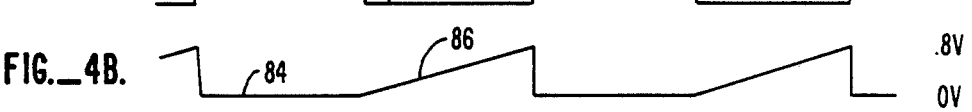
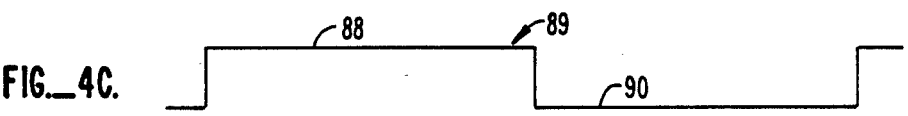

PULSE LENGTH INDICATOR

This is a continuation-in-part patent application of U.S. patent application Ser. No. 880,390, filed June 30, 1986, now abandoned.

BACKGROUND OF THE INVENTION

It is often desired to monitor the rotational speed of rotary machines, such as fans. When fans are used to cool electrical equipment, for example computers, it is very important that the fans operate at or above some minimum acceptable speed. On occasion the fan may slow down, or even stop, which may cause the computer to overheat if the reduction in fan speed is not noticed early enough. Thus it would be quite helpful if the operator could be alerted if the fan speed drops below the minimum acceptable speed. This would warn the operator of an impending problem before the temperature within the computer could rise as a result of the fan speed problem.

SUMMARY OF THE INVENTION

The present invention provides a relatively simple and straightforward apparatus for providing an operator an indication that a piece of rotary equipment, such as a fan, has slowed down below a minimum acceptable speed or has even stopped. This is achieved through the use of a pulse length indicator for signaling when a pulse length, representative of the fan speed, has exceeded a chosen duration. The pulse length indicator includes a ramp signal generator coupled to a cyclic signal source. The ramp signal generator produces a ramp signal, the level of the ramp signal being dependent upon the duration of a chosen one of the high and low levels of the cyclic signal.

The ramp signal is provided to a level sensitive switch which couples an indicator, such as LED, to a power source. When the level of the ramp signal is sufficient the switch closes to actuate the indicator. The ramp signal generator can be a simple R-C circuit connected between the power source and ground with the signal source being DC coupled to the switch. AC coupling can be used if desired. such as when the operation of the cyclic signal source is dependent upon the speed of a fan or other rotary member and the cyclic signal may be either a high or a low level when the rotary member stops.

An important aspect of the invention is the recognition that it would be desirable to notify the operator that a fan has slowed to an unacceptable speed. This provides the operator with important information well before the fan stops and before any temperature rise due to the slow speed operation of the fan.

A primary advantage of the invention is its simplicity. The circuitry for each indicator is simple and straightforward and yet provides the operator with the necessary information.

The invention is quite suitable for use with equipment having several fans, or other types of rotary equipment, from which cyclic signals can be obtained. One type of cyclic signal is that produced by a Hall effect switch. The cyclic signal created with a Hall switch is normally at one level, such as high, and temporarily changes to another voltage level for a short period of time, such as low, with each revolution. The normally high level of the cyclic signal charges the capacitor in the R-C circuit of the ramp signal generator. If the fan slows sufficiently, the level of the ramp signal is sufficient to turn the switching transistors or so to temporarily energize the indicator. During low speed operation an LED indicator will blink on and off rapidly to signal the low fan speed. Since the fan must be turning to have the Hall switch produce the low voltage portion of the cyclic signal, if the fan stops the cyclic source will produce a signal which remains high, which thus charges the capacitor so to keep the indicator active.

With some fans, such as some DC fans, a Hall effect switch is not needed to create a cyclic signal source. Rather, a cyclic signal is obtained directly from the DC fan. With one type of fan the cyclic signal is a 50 percent duty cycle square wave with two pulses per revolution. In one of the preferred embodiments, when the square wave cyclic signal is high, the capacitor of the R-C circuit remains discharged so that the switching transistors remain off. Once the cyclic signal goes low the voltage across the capacitor of the R-C circuit starts to increase thus creating the ramp signal. If the voltage increases sufficiently to turn the switching transistors on, which will occur when the fan slows down below the minimum acceptable speed, the indicator is actuated. Since this ramping occurs in a cyclic fashion, the indicator, such as an LED, is energized twice per revolution. With this type of cyclic signal may be either high or low when the fan stops. Therefore the cyclic signal source is preferably AC coupled to the R-C circuit so the indicator will remain energized when the fan stops.

Two types of indicators can be used. One is an LED for each fan. These LED's are usually mounted to the circuit board. A common indicator can be used which signals the operator when any one or more of the fans slow down. The common indicator is usually mounted to the control panel. Thus the operator is provided an indication that at least one of the fans is below speed while the individual indicators signal which fan is below speed.

Other features and advantages of the present invention will appear from the following description in which the preferred embodiment has been set forth in detail in conjunction with the accompanying drawings.

BRIEF DESCRIPTION OF THE DRAWINGS

FIG. 1 is a block diagram showing a pulse length indicator circuit according to the invention.

FIG. 2 is a detailed schematic of the pulse rate indicator circuit of FIG. 1.

FIGS. 3A–3D are traces showing the cyclic and ramp signals for normal and half-speed operation with a DC coupled ramp signal generator.

FIGS. 4A–4D are traces showing the cyclic and ramp signals for normal and half-speed operation with an AC coupled ramp signal generator.

DETAILED DESCRIPTION OF THE PREFERRED EMBODIMENT

Referring now to FIG. 1, a pulse length indicator system 2 includes broadly first and second indicator circuits 4, 6 coupled to first and second cyclic signal sources 8, 10, circuits 4. 6 each connected to a common power source 12 through a common power line 14. A panel LED indicator 16 is connected to power source 12 through common power line 14 and diode-ORed to first and second circuits 4, 6 through a common line 18 and diodes 20, 22.

First indicator circuit 4 includes a ramp signal generator 24 having an input terminal 26 connected to an output terminal 28 of source 8, a power terminal 30 connected to line 14 and a ramp signal terminal 32 connected to an input terminal 34 of a switch 36. Circuit 4 also includes an indicator in the form of an LED 38 mounted to the printed circuit board and connected between common power line 14 and a terminal 40 of switch 36.

Referring now also to FIGS. 2 and 3A-3D, cyclic signal source 8 is seen to provide a normal speed cyclic signal 44 to input terminal 26. Signal 44 is of the type normally produced by a Hall effect cyclic signal source 8 in the form of an AC motor driven fan having a Hall effect switch associated therewith to produce one or more (negative-going) pulses 54 for each revolution of the fan (not shown). Ramp signal generator 30 includes a resistor 46 connected to common power line 14 and a capacitor 48 connected to ground 42 with terminal 26 connected between the two. Thus while normal signal 44 is at its high or charging level 50, capacitor 48 is charged through resistor 46 so that generator 24 produces a ramp voltage 52 across capacitor 48. When normal signal 44 produces its relatively short discharging portion 54, capacitor 48 discharges through source 8 thus dropping the voltage across the capacitor back to 0 as shown by vertical portion 56 of discharge voltage 52.

Switch 36 comprises a Darlington configuration of transistors 58. Transistors 58 remain switched off until the voltage across capacitor 48 reaches the required switching voltage for the two transistors, typically 1.4 volts (0.7 Vbe for each transistor 58). As shown FIGS. 3C and 3D, when the fan or other monitored device, associated with source 8 is moving at a lower than desired speed, the charging portion 60 of half speed signal 62 is sufficiently long so that the ramp voltage 64 peaks out at at point 66, at which ramp voltage 64 is equal to 2 Vbe or 1.4 V. During the following period 68 transistors 58 switch on thus closing switch 36 so that LED's 38 and 16 are illuminated. The result is that while the cyclic signal from source 8 is below the chosen level, PC LED 38 and panel LED 16 blink on and off.

Second indicator circuit 6 is similar to first indicator circuit 4 with the exception of some additional components in its ramp signal generator 70. Generator 70 is AC coupled to source 10 through a resistor 72, a capacitor 74 and a current gain transistor 76 connected in a conventional fashion. The collector of transistor 76 is connected between a resistor 75 and a capacitor 77 which comprise the R-C circuit portion of ramp signal generator 70. This arrangement is used because the signal 78, see FIG. 4A, from source 10 is such that if the rotary member (not shown) stops, the signal provided by source 10 to signal generator 70 may be either high or low. With this arrangement of signal generator 70, the elevated or high voltage level portions 80 of signal 78 function to discharge capacitor 77 while the low level segments 82 function to charge capacitor 77. While signal 78 is high, transistor 76 is on thus discharging capacitor 48 as indicated by trace 84 in FIG. 4B. When signal 78 is low, transistor 76 turns off thus permitting capacitor 48 to charge through resistor 75 as indicated by the ramp voltage trace 86. FIGS. 4C and 4D illustrate the result when the discharging portion 88 and charging portion 90 of signal 89 are lengthened in time (a result of the fan slowing down) thus allowing the voltage 91 across capacitor 4S to increase to a point 92 after which transistors 58 turn on thus closing a switch 93 to illuminate its PC LED g4 and the panel LED 16. If signal 89 stays high, which can occur when the fan stops while providing portion 88, voltage 91 across capacitor 77 will remain at zero until capacitor 74 is fully charged, at which time transistor 76 will turn off. When this occurs voltage 91 will again begin to rise until point 92 is reached, after which PC LED 94 and panel LED 16 are illuminated.

Modification and variation can be made to the disclosed embodiment without departing from the subject of the invention as defined in the following claims. As indicated in FIGS. 1 and 2, numerous first and second circuits 4, 6, along with their associated signal sources 8, 10, can be connected to common lines 14, 18, Other types of voltage level sensitive switches, other than switches 36 and 93, can be used. Indicators other than visual indicators can be used.

What is claimed is:

1. A pulse length indicator, for use with a signal source of the type which provides a cyclic signal at a signal output, the cyclic signal having first and second level portions, the first level portion being of a first, potential variable, duration, the indicator comprising:
   ramp signal generator means, having a ramped signal terminal and an input terminal coupled to the signal output of the signal source, for producing a ramped signal at the ramped signal terminal, the ramped signal having a level which is dependent upon the first duration;
   a power source;
   indicator means, coupled to the power source, for providing an indication when actuated; and
   switch means, coupling the indicator means and the ramped signal terminal, for actuating the indicator means when the level of the ramped signal is at least as great as a chosen value, whereby the indicator means provides an indication that the first duration has exceeded a certain duration corresponding to the chosen value.

2. The indicator of claim 1 wherein the ramp signal generator means includes an R-C circuit, coupled to the power source, which charges and discharges according to the level of the cyclic signal.

3. The indicator of claim 1 wherein the switch means is AC coupled to the signal source through the ramped signal generator means.

4. The indicator of claim 1 wherein the switch means includes a switching transistor having a base terminal connected to the ramped signal generator.

5. The indicator of claim 4 wherein the ramped signal generator includes a resistor and a capacitor connected in series at a common terminal and between a power source and ground, the common terminal connected directly to the base terminal.

6. The indicator of claim 1 wherein the signal source is DC coupled to the switch means through the ramped signal generatoar means.

7. The indicator of claim 1 wherein the ramped signal generator means includes means for AC coupling the signal source and the switch means.

8. A pulse length indicator, for use with a signal source of the type which provides a cyclic signal at a signal output, the cyclic signal having a first and second level portions, the first level portion being of a first, potentially variable, duration, the indicator comprising:
   ramp signal generator means, having an input terminal coupled to the signal output of the signal source, for producing a ramped signal at the ramped signal terminal, the ramped signal having a level which is dependent upon the first duration level portion;

a power source;

indicator means, coupled to the power source, for providing an indication when acturated;

switch means, coupling the indicator means and the ramped signal terminal, for actuating the indicator means when the level of the ramped signal is at least as great as a chosen value; and the ramp signal generator means including means for AC coupling the signal source and the switch means;

whereby the indicator means provides an indication that the first duration has exceeded a certain duration corresponding to the chosen value.

9. A pulse length indicator, for use with a signal source of the type which provides a cyclic signal at a signal output, the cyclic signal having a first and second level portions, the first level portion being of a first, potentially variable, duration, the indicator comprising:

ramp signal generator means, having an input terminal coupled to the signal output of the signal source, for producing a ramped signal at the ramped signal terminal, the ramped signal having a level which is dependent upon the first duration;

a power source;

indicator means, coupled to the power source, for providing an indication when actuated;

switch means, coupling the indicator means and the ramped signal terminal, for actuating the indicator means when the level of the ramped signal is at least as great as a chosen value; and the ramp signal generator means including means for DC coupling the signal source and the switch means;

whereby the indicator means provides an indication that the first duration has exceeded a certain duration corresponding to the chosen value.

* * * * *